(12) United States Patent
Coeffe (10) Patent No.: US 9,109,726 B2
(45) Date of Patent: Aug. 18, 2015

(54) SET FOR OBTAINING A THREADED CONNECTION, METHOD FOR MAKING UP AND BREAKING OUT SAID CONNECTION, AND USE OF SAID CONNECTION IN A RISER

(75) Inventor: Guillaume Coeffe, Paris (FR)

(73) Assignees: VALLOUREC OIL AND GAS FRANCE, Aulnoye-Aymeries (FR); SUMITOMO METAL INDUSTRIES, Ltd., Osaka-shi (JP)

( * ) Notice: Subject to any disclaimer, the term of this patent is extended or adjusted under 35 U.S.C. 154(b) by 504 days.

(21) Appl. No.: 13/517,204

(22) PCT Filed: Dec. 10, 2010

(86) PCT No.: PCT/EP2010/007555
§ 371 (c)(1),
(2), (4) Date: Jun. 19, 2012

(87) PCT Pub. No.: WO2011/076349
PCT Pub. Date: Jun. 30, 2011

(65) Prior Publication Data
US 2012/0312550 A1 Dec. 13, 2012

(30) Foreign Application Priority Data
Dec. 23, 2009 (FR) .................................... 09 06319

(51) Int. Cl.
*E21B 17/02* (2006.01)
*F16L 15/00* (2006.01)
(Continued)

(52) U.S. Cl.
CPC ........... *F16L 15/002* (2013.01); *E21B 17/0423* (2013.01); *F16L 15/08* (2013.01)

(58) Field of Classification Search
CPC ... E21B 17/043; E21B 17/0423; E21B 17/08; E21B 17/0426; E21B 17/085; E21B 19/16; E21B 7/067; F16L 15/00; F16L 15/0041; F16L 15/004; F16L 15/003; F16L 15/002; F16L 15/001; F16L 15/08; Y10S 285/913
USPC .......... 166/380, 242.6, 377; 285/333, 330, 92
See application file for complete search history.

(56) References Cited

U.S. PATENT DOCUMENTS 4,384,737 A * 5/1983 Reusser ........................ 285/334
4,406,485 A 9/1983 Giebeler
(Continued)

FOREIGN PATENT DOCUMENTS

DE 4231084 A1 * 3/1994
EP 0 060 549 9/1982
(Continued)

OTHER PUBLICATIONS

International Search Report Issued Aug. 19, 2011 in PCT/EP10/07555 Filed Dec. 10, 2010.
(Continued)

*Primary Examiner* — Daniel P Stephenson
(74) *Attorney, Agent, or Firm* — Oblon, McClelland, Maier & Neustadt, L.L.P.

(57) ABSTRACT

A set for obtaining a threaded connection used in hydrocarbon wells includes a first tubular component, a second tubular component, and a third tubular component. A threaded zone provided on an internal circumferential surface of an end of the third component cooperates by makeup with one of two threaded zones of an end of the first component. A threaded zone provided on an external circumferential surface of the end of the third component cooperates by makeup with one of two threaded zones of the second component. The second and third components define an end of makeup of the threaded zones. The other threaded zone provided on the end of the first component cooperates by makeup with the other threaded zone provided on the second component.

18 Claims, 3 Drawing Sheets

(51) Int. Cl.
*E21B 17/042* (2006.01)
*F16L 15/08* (2006.01)

(56) References Cited

U.S. PATENT DOCUMENTS

| | | | | |
|---|---|---|---|---|
| 4,598,455 | A * | 7/1986 | Morris | 29/402.02 |
| 4,706,997 | A * | 11/1987 | Carstensen | 285/13 |
| 4,795,200 | A * | 1/1989 | Tung | 285/334 |
| 5,137,310 | A * | 8/1992 | Noel et al. | 285/333 |
| RE34,467 | E * | 12/1993 | Reeves | 285/334 |
| 5,474,334 | A * | 12/1995 | Eppink | 285/184 |
| 5,687,999 | A * | 11/1997 | Lancry et al. | 285/333 |
| 5,879,030 | A * | 3/1999 | Clayson et al. | 285/24 |
| 6,009,611 | A * | 1/2000 | Adams et al. | 29/407.01 |
| 6,045,165 | A * | 4/2000 | Sugino et al. | 285/333 |
| 6,070,912 | A * | 6/2000 | Latham | 285/61 |
| 6,237,967 | B1 * | 5/2001 | Yamamoto et al. | 285/333 |
| 6,749,020 | B1 * | 6/2004 | Knight | 166/242.6 |
| 6,752,436 | B1 * | 6/2004 | Verdillon | 285/333 |
| 7,014,223 | B2 * | 3/2006 | Della Pina et al. | 285/333 |
| 7,431,347 | B2 * | 10/2008 | Ernst et al. | 285/333 |
| 7,918,284 | B2 * | 4/2011 | Costa et al. | 166/384 |
| 8,225,876 | B2 * | 7/2012 | Mei | 166/380 |
| 8,840,152 | B2 * | 9/2014 | Carcagno et al. | 285/343 |
| 2007/0007760 | A1 * | 1/2007 | Stolle et al. | 285/1 |
| 2007/0236015 | A1 | 10/2007 | Sugino et al. | |
| 2012/0312550 | A1 * | 12/2012 | Coeffe | 166/377 |
| 2013/0146305 | A1 * | 6/2013 | Dupal et al. | 166/380 |

FOREIGN PATENT DOCUMENTS

| | | | |
|---|---|---|---|
| EP | 0158455 | A2 * | 10/1985 |
| EP | 0353182 | * | 1/1990 |
| EP | 1 664 477 | | 6/2006 |
| GB | 1521133 | A * | 8/1978 |
| GB | 2302386 | A * | 1/1997 |
| JP | 59-155684 | | 9/1984 |
| JP | 11-101207 | | 4/1999 |
| JP | 2004-270828 | | 9/2004 |
| JP | 2005-536691 | | 12/2005 |
| JP | 2008-527256 | | 7/2008 |
| SU | 1520291 | | 11/1989 |
| WO | WO 9604502 | A1 * | 2/1996 |
| WO | WO 2004/109173 | A1 | 12/2004 |
| WO | WO 2005/026494 | A1 | 3/2005 |

OTHER PUBLICATIONS

Japanese Office Action issued Jun. 17, 2014 in corresponding Japanese Patent Application No. 2012-545132 (with English Translation) (11 pages).

* cited by examiner

SET FOR OBTAINING A THREADED CONNECTION, METHOD FOR MAKING UP AND BREAKING OUT SAID CONNECTION, AND USE OF SAID CONNECTION IN A RISER

The present invention relates to a set for obtaining a threaded connection used for drilling or operating hydrocarbon wells. The set comprises a first and a second tubular component each provided at one of their ends with a male type threaded zone and also comprises a third tubular component, which is preferably shorter than the first two, provided at each of its ends with a female type threaded zone, which can cooperate by makeup with said male threaded zones. The invention concerns a method for making up such a set and a threaded connection resulting from makeup of said set. The invention also concerns a breakout method.

The term "component used for drilling and operation of hydrocarbon wells" means any element with a substantially tubular shape intended to be connected to another element of the same type or otherwise to finish by constituting either a string for drilling a hydrocarbon well or a riser for maintenance such as a work-over riser, or a casing string or tubing string involved in the operation of a well.

The term "connection" means the link between the tubular components. As an example, it is known to link two great length tubes by making up the end provided with a male threading of one into the end provided with a female threading of the other. It is also known to connect two great length tubular components using a much shorter tubular component also termed a coupling, by making up each of the female ends of the coupling with the male threaded end of the great length tubular components.

In known manner, the components used for drilling applications or for the operation of hydrocarbon wells are made up into each other with a high makeup torque. This latter is generally reached thanks to cooperation by tightening of abutment surfaces provided on each of the components or by means of threadings termed self-locking threadings. However, some applications induce high stresses, such as with risers, for example. For this reason, very high makeup torques must be used in order to avoid breakout of the components. However, the makeup torques are limited by the risk of plastification. Thus, it is necessary to secure the connections against the risks of untimely breakout.

It is possible to lock tubular components which are made up together against breakout using parts which block the rotation of the tubular components with respect to each other. In document EP-1 664 477, a first tubular component is made up with a second tubular component, the first tubular component bearing on a portion with a smaller external diameter. Two rings will respectively block one and the other component once they have been made up. The rings are also secured together by means of rods screwed to said rings. In document U.S. Pat. No. 4,406,485, a first tubular component is made up with a second, also tubular, component then relative rotation of one with respect to the other is locked using a part blocked by a screw in a housing which extends into the thickness of the first and second components.

Those types of solution, however, suffer from the disadvantage of increasing the number of parts present in a connection and of resorting to the use of screws, bolts etc, a fact that is not appreciated by users since the design of facilities must be simplified as far as possible in order to limit maintenance (depending on the number of parts) and pollution of the well (risk of loss of screws, for example).

The invention concerns a set of tubular components which can readily be made up one into another to obtain a connection without the set breaking out in an untimely manner when the connection is in service.

More precisely, a set for obtaining a threaded connection used in hydrocarbon wells comprises:
- a first tubular component comprising one end comprising on its external circumferential surface two threaded zones of identical lead;
- a second tubular component provided on its internal circumferential surface with at least two threaded zones;
- a third tubular component comprising one end provided on its internal circumferential surface with at least one threaded zone and provided on its external circumferential surface with at least one threaded zone;

and in which:
- the threaded zone provided on the internal circumferential surface of the end of the third component is capable of cooperating by makeup with one of the two threaded zones of the end of the first component;
- the threaded zone provided on the external circumferential surface of the end of the third component is capable of cooperating by makeup with one of the two threaded zones of the second component, the second and third components further comprising means for defining the end of makeup of said threaded zones;
- the other threaded zone provided on the end of the first component is capable of cooperating by makeup with the other threaded zone provided on the second component.

According to certain characteristics, the lead of the threaded zone provided on the external circumferential surface of the end of the third component is greater by at least 10% than the lead of the threaded zone provided on the internal circumferential surface of the end of the third component, and preferably equal to twice the lead of the threaded zone provided on the internal circumferential surface of the end of the third component.

According to one characteristic, the threaded zone provided on the external circumferential surface of the end of the third component and the threaded zone provided on the internal circumferential surface of the end of the third component are in opposite directions.

According to one characteristic, the means for defining the end of makeup between the threaded zone provided on the external circumferential surface of the end of the third component and the corresponding threaded zone of the second component are abutment surfaces respectively provided on the terminal surface of the end of the third component and on a surface formed by a shoulder on the second component.

According to one characteristic, the end of the first component comprises, on its terminal surface, an abutment surface which is capable of cooperating in abutment with a corresponding abutment surface provided on a surface formed by a shoulder on the second component.

According to one characteristic, the means for defining the end of makeup between the threaded zone provided on the external circumferential surface of the end of the third component and the corresponding threaded zone of the second component are constituted by the fact that said threaded zones are mutually self-locking.

According to one characteristic, the end of the first component comprises, on its terminal surface, a sealing surface which is capable of cooperating by tightening with a corresponding sealing surface provided on a surface formed by a shoulder on the second component.

According to one characteristic, the threaded zones of the tubular components are located on tapered envelopes with an angle of taper in the range 0.5 to 4 degrees.

According to one characteristic, the threaded zones provided on the end of the first component are located on the same tapered envelope so as to form a single continuous threading.

A method for obtaining a threaded connection used in hydrocarbon wells comprises the following steps:
  providing a set for obtaining a threaded connection as defined above;
  making up the threaded zone provided on the external circumferential surface of the end of the third component into the corresponding threaded zone provided on the end of the second component, until the end of makeup is achieved;
  making up the two threaded zones provided on the external circumferential surface of the end of the first tubular component into the corresponding threaded zones which are respectively provided on the internal circumferential surfaces of the second and third components;
  applying a breakout torque C0 between the second and the third tubular components.

A connection may be obtained using a method in accordance with the invention in which the first and third tubular components are great length tubes, while the second tubular component is a coupling.

A connection may be obtained using a method in accordance with the invention in which the first tubular component is a great length tube, while the second and third tubular components are couplings.

A double connection may be constituted by two connections in accordance with the invention in which the second and third tubular components are couplings. The third tubular components form one and the same tubular component.

A threaded connection in accordance with the invention may be used in a riser.

A method for breaking out a threaded connection comprises the following steps:
  applying a makeup torque C0 between the second and the third tubular components;
  breaking out the two threaded zones provided on the external circumferential surface of the first end of the tubular component from their corresponding threaded zones;
  breaking out the threaded zone provided on the external circumferential surface of the third end from the threaded zone.

The characteristics and advantages of the invention will now be explained in more detail in the following description, made with reference to the accompanying drawings.

Figure 1:
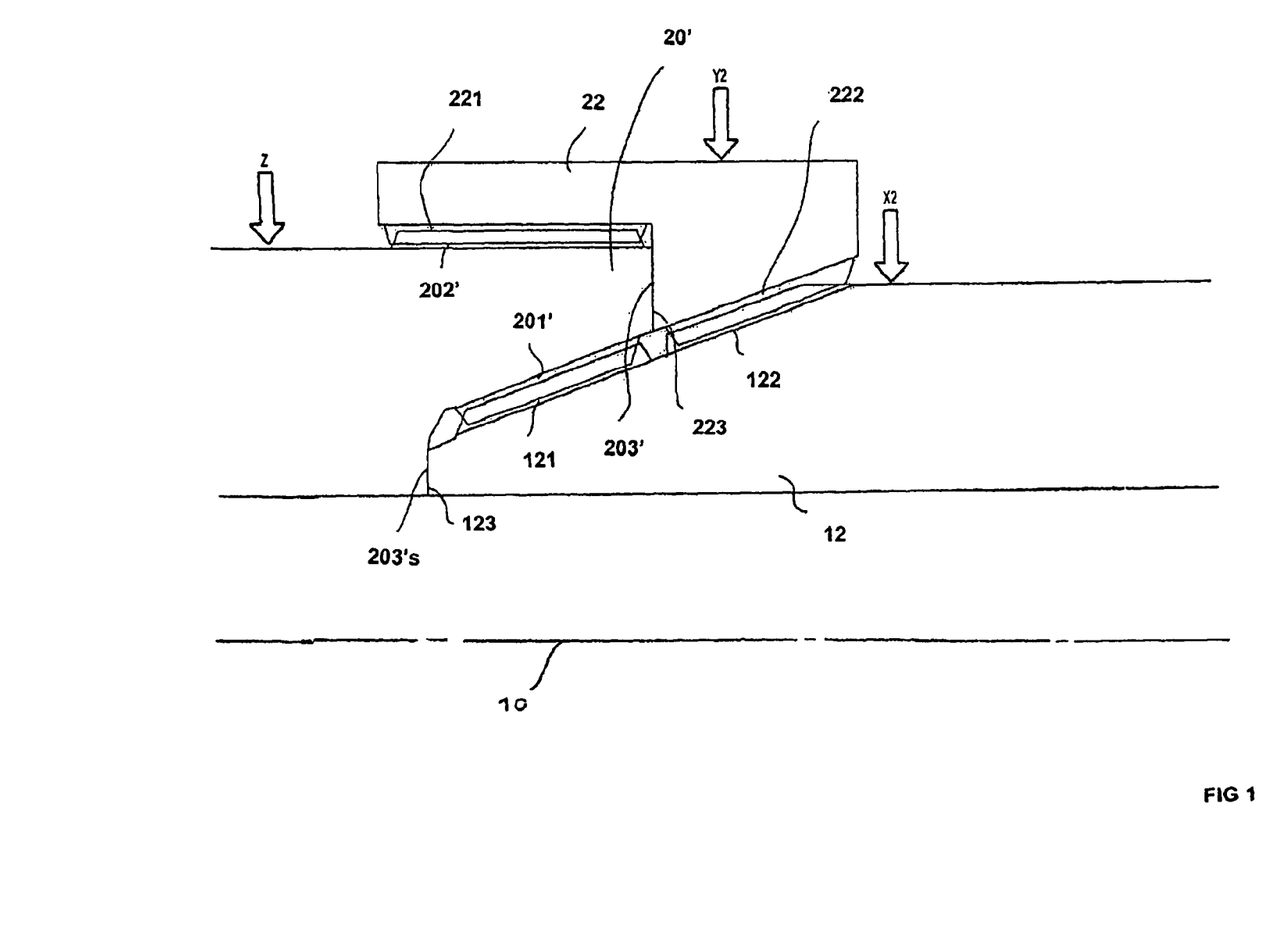
FIGS. 1 and 2 are each a diagrammatic view in longitudinal section of a connection resulting from connecting a set of two great length tubular components by makeup using a coupling.

FIG. 1 shows three tubular components with an axis of revolution 10. One of the ends 12 of the first component is provided on its external circumferential surface with two threaded zones 121, 122. The lead of each of the threaded zones is identical. The second tubular component 22 is provided on its internal circumferential surface with two threaded zones 221, 222. The third component is provided at one of its ends 20' with a threaded zone 201' on its internal circumferential surface and a threaded zone 202' on its external circumferential surface.

The threaded zone 201' provided on the internal circumferential surface of the end 20' of the third component is capable of cooperating by makeup with the threaded zone 121 provided on the external circumferential surface of the end 12 of the first component. The first and the third components further comprise means for defining the end of makeup of said threaded zones, such that makeup is stopped after a predefined number of turns. Here, these means comprise abutment surfaces respectively provided on a shoulder 203's of the third tubular component and on the terminal surface 123 of the first tubular component. It is also possible to envisage other elements which can define the end of makeup, such as self-locking threadings for the threaded zones 201' and 121, for example. The principle of these threadings is to cause the width of the threads to increase with distance from the terminal surface of the component while causing the width of the thread roots to decrease such that at the end of makeup the threads are locked flank against flank when the width of the roots no longer allows the threads to advance.

The threaded zone 202' provided on the external circumferential surface of the end 20' of the third component is capable of cooperating by makeup with the threaded zone 221 of the second component 22. The second component 22 and the end 20' of the third component further comprise means for defining the end of makeup of said threaded zones, such that makeup is stopped after a predefined number of turns. Here, these means comprise abutment surfaces respectively provided on a shoulder 203' of the second tubular component and on the terminal surface 223 of the third tubular component. It is also possible to envisage other elements which can define the end of makeup, such as self-locking threadings for the threaded zones 202' and 221, for example.

The other threaded zone 122 provided on the first end 12 is capable of cooperating by makeup with the other threaded zone 222 provided on the second component 22.

The term "threaded zone" means any zone belonging to the circumferential surface of the tubular component and which comprises a threading; the threading could possibly be continuous, interrupted, multiple, single, regular, irregular, etc.

The term "terminal surface" means the surface which extends at the free edge of the end of a tubular component over the thickness thereof, as opposed to the circumferential surface which extends along the longitudinal axis of the component. In other words, the terminal surface is in the form of an annular surface which is generally radially orientated with respect to the axis 10 of the tubular components.

Figure 2:
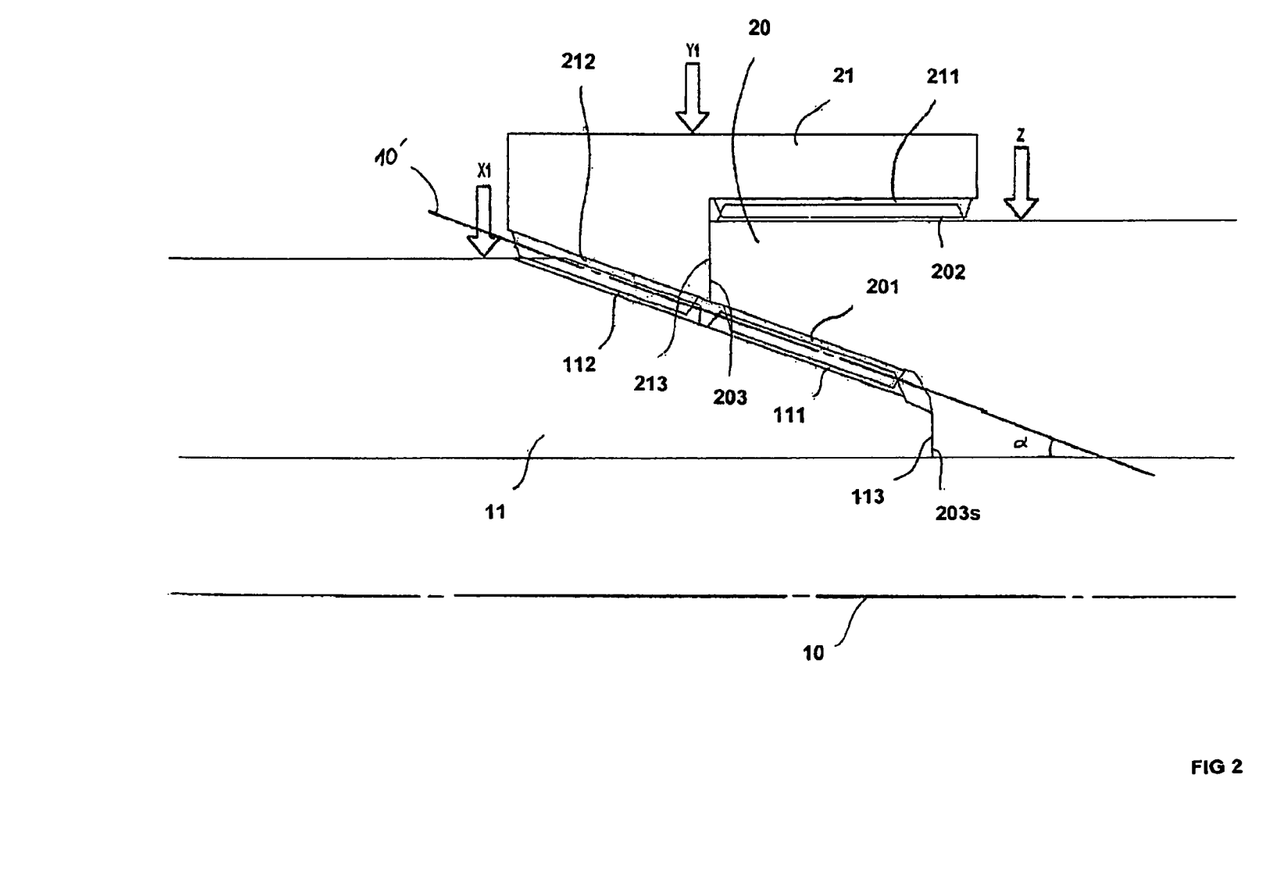

FIG. 2 shows an embodiment which is close to that shown in FIG. 1. Again, there are three tubular components with an axis of revolution 10. One of the ends 11 of the first component is provided on its external circumferential surface with two threaded zones 111, 112. The lead of each of the threaded zones is identical. The second tubular component 21 is provided on its internal circumferential surface with two threaded zones 211, 212. The third component is provided at one of its ends 20 with a threaded zone 201 on its internal circumferential surface and a threaded zone 202 on its external circumferential surface.

The threaded zone 201 provided on the internal circumferential surface of the end 20 of the third component is capable of cooperating by makeup with the threaded zone 111 provided on the external circumferential surface of the end 11 of the first component. The threaded zone 202 provided on the external circumferential surface of the end 20 of the third component is capable of cooperating by makeup with the threaded zone 211 of the second component 21. The second component 21 and the end 20 of the third component further comprise means for defining the end of makeup of said threaded zones, such that makeup is stopped after a predefined number of turns. The threaded zone 112 provided on the first end 11 is capable of cooperating by makeup with the threaded zone 212 provided on the second component 21.

The two variations shown in FIGS. 1 and 2 constitute a mode of reinforced makeup between the ends of the first and third tubular components. In fact, securing the ends of the first and third components by makeup partly involves direct cooperation between a threaded zone provided on the first component and a threaded zone provided on the third component. Next, it also involves the cooperation of threaded zones between the first and the second component and between the second and the third component. In summary, it appears that over a portion represented by the length of the second component the threaded zones are long. This means that the total tightening contact surface between the threads is very high per unit length of tube over this portion.

It is possible to further optimize securing the first and third tubular components by makeup by implementing certain characteristics relating to the threaded zones of the third component.

In accordance with a first improvement and with reference to FIGS. 1 and 2, the lead of the threaded zone 202, 202' provided on the external circumferential surface of the end 20, 20' of the third component is greater by at least 10% than the lead of the threaded zone 201, 201' provided on the internal circumferential surface of said end 20, 20'. The term "lead" means the distance covered by the tubular component when a complete turn is made. It will also be recalled that when a threaded tubular component is made up into another tubular component comprising a complementary threading, said threaded component is displaced by carrying out a translation along its axis of revolution.

Thus, when the first, second and third tubular components are made up together, it is not possible to break out the third component from the set constituted by the first and second ends. In fact, the difference in lead between the threaded zones 201, 202, 201', 202' which retain the third tubular component in the set constituted by the first and second components brings about locking. If an attempt is made to break out the third tubular component, there is a distortion between the threaded zone 202, 202' located on the external circumferential surface and the threaded zone 201, 201' located on the internal circumferential surface of the end 20, 20' of the third component; more precisely, it involves pressing the load flanks of the threaded zone located on the internal circumferential surface of the third component against the load flanks of the threaded zone located on the external circumferential surface of the end 11, 12 of the first component.

In accordance with a second improvement and still with reference to FIGS. 1 and 2, the threaded zone 202, 202' provided on the external circumferential surface of the end 20, 20' of the third component is produced in the direction opposed to the direction of the threaded zone 201, 201' provided on the internal circumferential surface of said end 20, 20'. Thus, when the first, second and third tubular components are made up together, it is not possible to break out the third component from the set constituted by the first and the second ends. In fact, reversing the directions of the threaded zones 201, 202, 201', 202' which retain the third tubular component in the set constituted by the first and second components brings about locking.

The locking obtained by the divergency of the threaded zones 111, 121 and 112, 122 formed on the external circumferential surface of the end 11, 12 of the first component means that the set composed of the first, second and third components can be locked using the method comprising the following steps:

- providing a set for obtaining a threaded connection;
- making up the threaded zone 202; 202' provided on the external circumferential surface of the end 20; 20' of the third component into the corresponding threaded zone 211; 221 provided on the end 21; 22 of the second component, until the end of makeup is achieved;
- making up the two threaded zones 111, 112; 121, 122 provided on the external circumferential surface of the end of the first tubular component 11; 12 into the corresponding threaded zones which are respectively provided on the internal circumferential surfaces 212, 201; 222, 201' of the second and third components;
- applying a breakout torque C0 between the second and the third tubular components.

Regarding the choice of the torque C0, it must be defined as a function of the dimensions of the tubular components and the selected application (drilling, riser, etc).

Thus, the load flanks of the threaded zone 111, 121 remain pressed against the load flanks of the corresponding threaded zone 201, 201' while the stabbing flanks of the threaded zone 112, 122 are pressed against the stabbing flanks of the corresponding threaded zone 212, 222. Said pressing blocks the breakout of the first tubular component.

Hence, we have the breakout method comprising the following steps:

- applying a makeup torque between the second and third tubular components in order to eliminate the pressing between the threaded zones 111, 121 and 112, 122 of the first component;
- breaking out the two threaded zones 111, 112; 121, 122 provided on the external circumferential surface of the first end of the tubular component 11; 12 from their corresponding threaded zones;
- breaking out the threaded zone 202; 202' provided on the external circumferential surface of the third end 20; 20' from the threaded zone 211; 221.

The embodiments detailed above are of particular application to risers. These risers, which connect the surface of the sea to the bottom, are particular prone to the problem of breakout in the presence of a swell and marine currents which induce high torsional stresses. The torsional stresses primarily affect two consecutive great length tubes and not a great length tube and the coupling to which it is connected. More precisely, in the case in which the first and third components are great length tubes, while the second component is a coupling, said torsional stresses cannot break out the first and third components from one another. The first component necessarily has to be broken out from the set constituted by the third component and the coupling made up together, i.e. by gripping at the mark Y1 or Y2 and at the mark X1 or X2, as can be seen in FIGS. 1 and 2.

The following definitions will be recalled: a short tube is termed a "coupling" and is intended to connect great length tubes. Such a connection is termed a T&C connection (threaded and coupled). By way of example, coupling type tubes are between 0.2 to 0.7 meters long and great length tubes are between 6 and 15 meters long.

Figure 3:
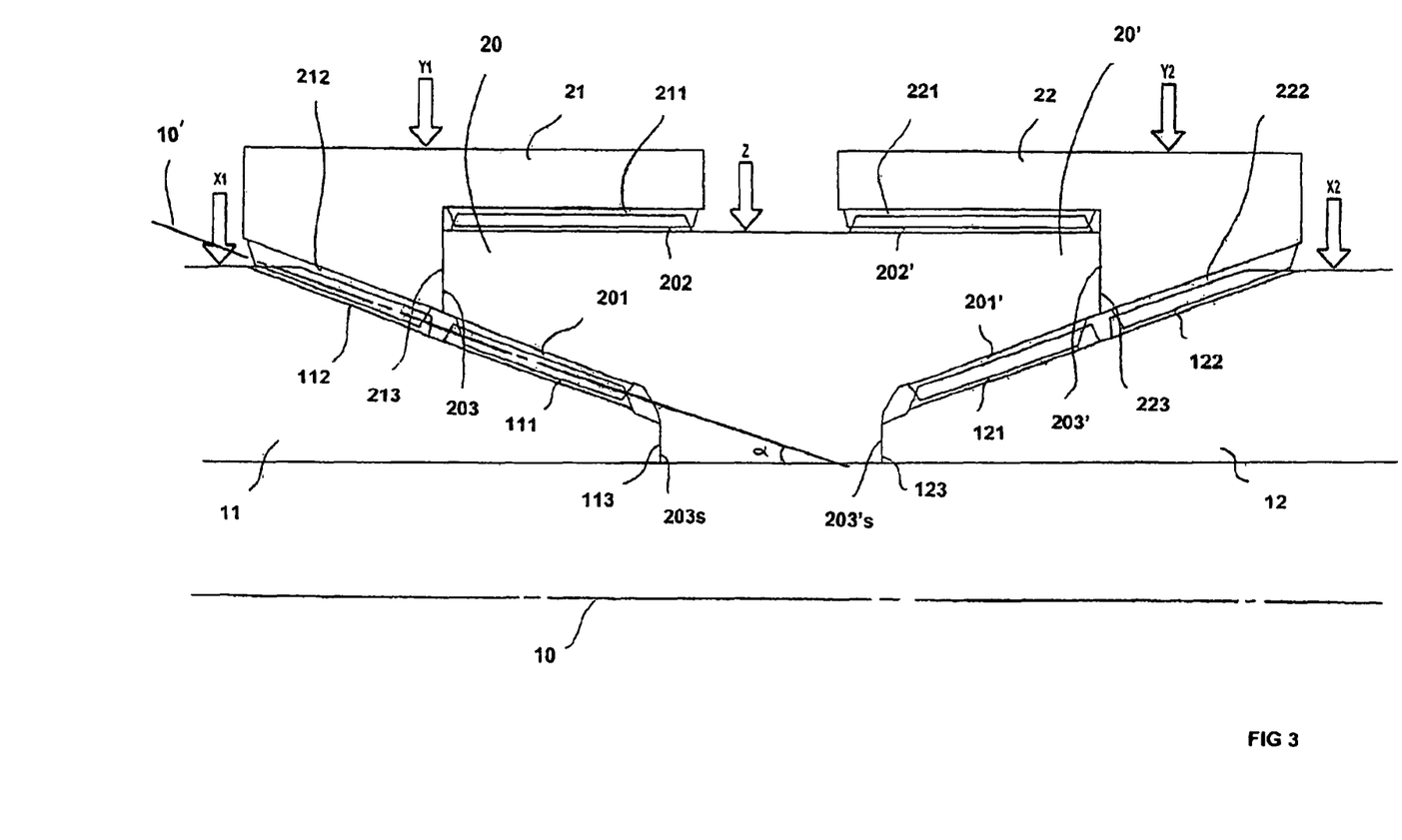
FIG. 3 is a diagrammatic view in longitudinal section of a connection resulting from connecting a set of two great length components (by makeup) using a coupling constituted by three portions.

Another embodiment is shown in FIG. 3 which combines the embodiments described in FIG. 1 and in FIG. 2. Two connections in accordance with the invention each comprise a first, a second and a third tubular component. For one of the connections, the threaded ends 11, of the first and third tubular components are made up together and in a coupling 21. As regards the other connection, the threaded ends 12, 20' of the first and third tubular components are made up together and in a coupling 22. The first tubular components 11, 12 are great length tubes. The ends 20 and 20' are the ends of the same tubular component which is also a coupling. The tubes 11 and 12 are connected by a set constituted by three couplings 20, 21, 22. It is not possible to break out the first tubular components 11, 12 from each other by gripping X1 and X2. It is necessary to break out each of the first tubular components 11, 12 from the set constituted by the three couplings 20, 21, 22 by gripping one at X1 and Y1 and the other at X2, Y2. A multitude of possibilities can then be envisaged in this regard, since the ends 20, 20' of the third tubular component do not have to be symmetrical.

In summary, the connections described above constitute a true anti-breakout function.

Advantageously, the end 11, 12 of the first component comprises on its terminal surface 113, 123, in addition to the abutment surface, a sealing surface which can cooperate by tightening with a corresponding sealing surface provided on the shoulder 203$s$, 203$s'$ of the second component 21, 22. In fact, in the case in which the connection has to be sealed, it is necessary to render the sealing surfaces capable of coming into tightening contact, at the first and third components as well as at the second and third components. Regarding the type of sealing surfaces, reference can be made to conventional sealing surfaces in the technical field under consideration. They may be cone-on-cone or torus-on-cone or torus-and-cone-on-cone as described in applications US 2004/0262919 or US 2005/0248153, herein incorporated by reference.

Advantageously, the threaded zones may be located on tapered envelopes forming an angle of taper with the axis of revolution 10 of the connection. This means that makeup of the tubular components together is facilitated. The taper generatrices generally have a half angle in the range 0.5 to 4 degrees, preferably in the range 1 to 2 degrees.

Advantageously, the threaded zones 111, 112, 121, 122 provided at the end 11, 12 of the first component are located on the same tapered envelope with an angle of taper a with respect to the axis of revolution 10 and form a single continuous threading. This means that machining operations on the first component are rendered easier. Hence, care must be taken that the complementary threaded zones 201, 212, 201', 202 are arranged in a compatible manner. As an example, the threaded zones 201 and 212 could be machined in one operation when the coupling 21 is made up with the end 20 of the third tubular component.

Other embodiments are, of course, possible by arranging the threaded zones 211, 212, 221, 222 located on the internal circumferential surface of the second component 21, 22 on the same tapered or even cylindrical envelope. In this case, the threaded zones 111, 112, 121, 122 provided on the end 11, 12 of the first component are not located on the same envelope.

The invention claimed is:

1. A set for obtaining a threaded connection used in hydrocarbon wells, comprising:
   a first tubular component comprising one end provided on its external circumferential surface with at least two threaded zones of identical lead;
   a second tubular component provided on its internal circumferential surface with at least two threaded zones;
   a third tubular component comprising one end provided on its internal circumferential surface with at least one threaded zone and provided on its external circumferential surface with at least one threaded zone, wherein
   the threaded zone provided on the internal circumferential surface of the end of the third component is configured to cooperate by makeup with one of the two threaded zones of the end of the first component,
   the threaded zone provided on the external circumferential surface of the end of the third component is configured to cooperate by makeup with one of the two threaded zones of the second component, the second and third components further comprising means for defining the end of makeup of said threaded zones, and
   the other threaded zone provided on the end of the first component is configured to cooperate by makeup with the other threaded zone provided on the second component,
   in which the threaded zones of the tubular components are located on tapered envelopes with an angle of taper in the range 0.5 to 4 degrees.

2. The set for obtaining a threaded connection according to claim 1, in which the lead of the threaded zone provided on the external circumferential surface of the end of the third component is greater by at least 10% than the lead of the threaded zone provided on the internal circumferential surface of the end of the third component.

3. The set for obtaining a threaded connection according to claim 2, in which the lead of the threaded zone provided on the external circumferential surface of the end of the third component is substantially equal to twice the lead of the threaded zone provided on the internal circumferential surface of the end of the third component.

4. The set for obtaining a threaded connection according to claim 1, in which the threaded zone provided on the external circumferential surface of the end of the third component and the threaded zone provided on the internal circumferential surface of the end of the third component are in opposite directions.

5. The set for obtaining a threaded connection according to claim 1, in which the means for defining the end of makeup between the threaded zone provided on the external circumferential surface of the end of the third component and the corresponding threaded zone of the second component are abutment surfaces respectively provided on the terminal surface of the end of the third component and on a surface formed by a shoulder on the second component.

6. The set for obtaining a threaded connection according to claim 5, in which the end of the first component comprises, on its terminal surface, a sealing surface which is configured to cooperate by tightening with a corresponding sealing surface provided on a surface formed by a shoulder on the second component.

7. The set for obtaining a threaded connection according to claim 1, in which the end of the first component comprises, on its terminal surface, an abutment surface which is configured to cooperate in abutment with a corresponding abutment surface provided on a surface formed by a shoulder on the second component.

8. The set for obtaining a threaded connection according to claim 1, in which the means for defining the end of makeup between the threaded zone provided on the external circumferential surface of the end of the third component and the corresponding threaded zone of the second component are constituted by said threaded zones being mutually self-locking.

9. The set for obtaining a threaded connection according to claim 1, in which the threaded zones provided on the end of the first component are located on the same tapered envelope so as to form a single continuous threading.

10. A method for obtaining a threaded connection used in hydrocarbon wells, comprising:

providing a set for obtaining a threaded connection in accordance with claim 1;

making up the threaded zone provided on the external circumferential surface of the end of the third component into the corresponding threaded zone provided on the end of the second component, until the end of makeup is achieved; and making up the two threaded zones provided on the external circumferential surface of the end of the first tubular component into the corresponding threaded zones which are respectively provided on the internal circumferential surfaces of the second and third components.

11. The method for obtaining a threaded connection according to claim 10, wherein, after the making up the two threaded zones, a breakout torque C0 is applied between the second and the third tubular components.

12. A connection obtained according to claim 11, in which the first and third tubular components are greater in length than the second tubular component, the second tubular component being a coupling.

13. A connection obtained according to claim 11, in which the first tubular component is greater in length than both the second and third tubular components, the second and third tubular components being couplings.

14. A double connection constituted by two connections obtained according to claim 13, wherein the third components form one and the same tubular component.

15. A threaded connection obtained according to claim 11, configured for use in a riser.

16. A method for breaking out a threaded connection obtained according to claim 11, comprising:

applying a makeup torque C0 between the second and the third tubular components;

breaking out the two threaded zones provided on the external circumferential surface of the first end of the tubular component from their corresponding threaded zones; and breaking out the threaded zone provided on the external circumferential surface of the third end from the threaded zone.

17. A set for obtaining a threaded connection used in hydrocarbon wells, comprising:

a first tubular component comprising one end provided on its external circumferential surface with at least two threaded zones of identical lead;

a second tubular component provided on its internal circumferential surface with at least two threaded zones;

a third tubular component comprising one end provided on its internal circumferential surface with at least one threaded zone and provided on its external circumferential surface with at least one threaded zone, wherein the threaded zone provided on the internal circumferential surface of the end of the third component is configured to cooperate by makeup with one of the two threaded zones of the end of the first component, the threaded zone provided on the external circumferential surface of the end of the third component is configured to cooperate by makeup with one of the two threaded zones of the second component, the second and third components further comprising means for defining the end of makeup of said threaded zones, the other threaded zone provided on the end of the first component is configured to cooperate by makeup with the other threaded zone provided on the second component, in which the means for defining the end of makeup between the threaded zone provided on the external circumferential surface of the end of the third component and the corresponding threaded zone of the second component are abutment surfaces respectively provided on the terminal surface of the end of the third component and on a surface formed by a shoulder on the second component, and in which the end of the first component comprises, on its terminal surface, a sealing surface which is configured to cooperate by tightening with a corresponding sealing surface provided on a surface formed by a shoulder on the second component.

18. A set for obtaining a threaded connection used in hydrocarbon wells, comprising:

a first tubular component comprising one end provided on its external circumferential surface with at least two threaded zones of identical lead;

a second tubular component provided on its internal circumferential surface with at least two threaded zones;

a third tubular component comprising one end provided on its internal circumferential surface with at least one threaded zone and provided on its external circumferential surface with at least one threaded zone, wherein the threaded zone provided on the internal circumferential surface of the end of the third component is configured to cooperate by makeup with one of the two threaded zones of the end of the first component, the threaded zone provided on the external circumferential surface of the end of the third component is configured to cooperate by makeup with one of the two threaded zones of the second component, the second and third components further comprising means for defining the end of makeup of said threaded zones, the other threaded zone provided on the end of the first component is configured to cooperate by makeup with the other threaded zone provided on the second component, and in which the end of the first component comprises, on its terminal surface, an abutment surface which is configured to cooperate in abutment with a corresponding abutment surface provided on a surface formed by a shoulder on the second component.

* * * * *

UNITED STATES PATENT AND TRADEMARK OFFICE
CERTIFICATE OF CORRECTION

PATENT NO. : 9,109,726 B2
APPLICATION NO. : 13/517204
DATED : August 18, 2015
INVENTOR(S) : Guillaume Coeffe Page 1 of 1

It is certified that error appears in the above-identified patent and that said Letters Patent is hereby corrected as shown below:

In the Specification

Column 7, line 39, 'an angle of taper a' should be changed to --an angle of taper α--.

Signed and Sealed this
Nineteenth Day of April, 2016

Michelle K. Lee
*Director of the United States Patent and Trademark Office*